US012657470B2

(12) United States Patent　　　　　(10) Patent No.:　US 12,657,470 B2
Ijiri et al.　　　　　　　　　　　　　(45) Date of Patent:　　Jun. 16, 2026

(54) OPERATION PREDICTION DEVICE THAT PREDICTS OPERATIONS PERFORMED BY A USER ON A DATASET, MODEL TRAINING METHOD FOR SAME, AND OPERATION PREDICTION METHOD

(71) Applicant: OMRON Corporation, Kyoto (JP)

(72) Inventors: Yoshihisa Ijiri, Kyoto (JP); Ryo Yonetani, Tokyo (JP); Tatsunori Taniai, Tokyo (JP)

(73) Assignee: OMRON CORPORATION, Kyoto (JP)

( * ) Notice: Subject to any disclaimer, the term of this patent is extended or adjusted under 35 U.S.C. 154(b) by 726 days.

(21) Appl. No.: 18/002,698

(22) PCT Filed: Jun. 17, 2021

(86) PCT No.: PCT/JP2021/022970
　　§ 371 (c)(1),
　　(2) Date: Dec. 21, 2022

(87) PCT Pub. No.: WO2022/004399
　　PCT Pub. Date: Jan. 6, 2022

(65) Prior Publication Data
　　US 2023/0334323 A1　　Oct. 19, 2023

(30) Foreign Application Priority Data
　　Jul. 2, 2020　　(JP) ................................. 2020-115035

(51) Int. Cl.
　　*G06N 3/04*　　　(2023.01)
　　*G06N 3/0455*　　(2023.01)
　　(Continued)

(52) U.S. Cl.
　　CPC ........... *G06N 3/084* (2013.01); *G06N 3/0455* (2023.01)

(58) Field of Classification Search
　　CPC ............................. G06N 3/045; G06N 3/0455
　　See application file for complete search history.

(56) References Cited

U.S. PATENT DOCUMENTS

| | | | |
|---|---|---|---|
| 12,367,420 B2 * | 7/2025 | Divakaran | ............. G06N 20/10 |
| 2020/0134034 A1 * | 4/2020 | Zhao | ......................... G06N 3/09 |

FOREIGN PATENT DOCUMENTS

| | | |
|---|---|---|
| JP | 2018063484 A | 4/2018 |

OTHER PUBLICATIONS

Yang, Deqing, et al. "Knowledge embedding towards the recommendation with sparse user-item interactions." Proceedings of the 2019 IEEE/ACM International Conference on Advances in Social Networks Analysis and Mining. 2019. (Year: 2019).*

(Continued)

*Primary Examiner* — Hal Schnee
(74) *Attorney, Agent, or Firm* — ROSSI, KIMMS & McDOWELL LLP

(57) ABSTRACT

A prediction model (1) includes a first module (M1) that calculates, for each of a plurality of objects $(x_i)$ in a dataset (x), an index value $(v_i)$ corresponding to a combination of the object $(x_i)$ and attribute information (a) using a neural network, and a second module (M2) that calculates a prediction result (y) of an operation to be performed by a user by performing a predetermined process on a plurality of index values $(v_1, \ldots, v_N)$ obtained from the first module (M1) and corresponding to the respective plurality of objects $(x_1, \ldots, x_N)$.

11 Claims, 10 Drawing Sheets

(51) Int. Cl.
   *G06N 3/08* (2023.01)
   *G06N 3/084* (2023.01)

(56) References Cited

OTHER PUBLICATIONS

Karamanolakis, Giannis, et al. "Item recommendation with variational autoencoders and heterogeneous priors." Proceedings of the 3rd workshop on deep learning for recommender systems. 2018. (Year: 2018).*

Quadrana, Massimo, et al. "Personalizing session-based recommendations with hierarchical recurrent neural networks." proceedings of the Eleventh ACM Conference on Recommender Systems. 2017. (Year: 2017).*

International Search Report issued in International Appln. No. PCT/JP2021/022970 mailed Aug. 24, 2021. English translation provided.

Written Opinion issued in International Appln. No. PCT/JP2021/022970 mailed Aug. 24, 2021. English translation provided.

Kamishima, "Nantonac Collaborative Filtering—A Model-Based Approach" Proceedings of the Fourth ACM Conference on Recommender Systems (RecSys'10). Association for Computing Machinery, 2010, pp. 273-276.

Sharma, "Listwise Learning to Rank with Deep Q-Networks", arXiv:2002.07651v1, University of California, Berkeley, Feb. 2020, pp. 1-8.

PEI. "Personalized Re-ranking for Recommendation" arXiv:1904. 06813v3. Proceedings of the 13th ACM Conference on Recommender Systems (RecSys'19), Association for Computing Machinery, 2019, pp. 3-11.

Takahashi, "Accuracy Improvement of Food Photo Attractiveness Estimation Based on Consideration of Image Features" Technical Report of IEICE. Oct. 6, 2016, 116(245), pp. 1-6. English abstract provided.

Lu, "Rating Image Aesthetics Using Deep Learning" IEEE Transactions on Multimedia, Nov. 2015, 17(11), pp. 1-13.

Grover, "Stochastic Optimization of Sorting Networks via Continuous Relaxations" arXiv:1903.08850v1, 2019, pp. 1-23.

Cuturi, "Differentiable Sorting Using Optimal Transport: The Sinkhorn CDF and Quantile Operator" arXiv:1905.11885v1, 2019, pp. 1-10.

Jang, "Categorical Reparameterization with Gumbel-Softmax" arXiv:1611.01144v1, 2016, and arXiv:1611.01144v5, 2017. pp. 1-26.

Extended European Search Report issued in European Appln. No. 21831799.8, mailed May 8, 2024.

Pang et al. "A Novel Top-N Recommendation Approach Based on Conditional Variational Auto-Encoder", 2019, pp. 357-368.

\* cited by examiner

OPERATION PREDICTION DEVICE THAT PREDICTS OPERATIONS PERFORMED BY A USER ON A DATASET, MODEL TRAINING METHOD FOR SAME, AND OPERATION PREDICTION METHOD

TECHNICAL FIELD

The present invention relates to a technique for predicting a personal operation using machine learning.

BACKGROUND

In many situations, individuals may perform specific operations on multiple objects (candidates) based on their individual (or personal) evaluation, such as subjective evaluation or evaluation based on experiences. One example is a normal social life situation in which a delicious looking dish is chosen from a restaurant menu, photographs of multiple candidate persons are ranked in the order of attractiveness, and appealing items for coordination are chosen from a group of products displayed at a store.

Research has been underway to predict, using machine learning, such personal evaluation dependent on human subjectivity and experiences. Non-Patent Literature 1 below describes a method for evaluating a degree by which food in a photograph looks delicious. Non-Patent Literature 2 below describes a method for evaluating aesthetics of an image.

CITATION LIST

Non-Patent Literature

Non-Patent Literature 1: Kazuma Takahashi; Keisuke Doman; Yasutomo Kawanishi; Takatsugu Hirayama; Ichiro Ide; Daisuke Deguchi; Hiroshi Murase, Accuracy Improvement of Food Photo Attractiveness Estimation Based on Consideration of Image Features. IEICE Technical Report Oct. 6, 2016, 116(245), 41-46.

Non-Patent Literature 2: X. Lu; Z. Lin; H. Jin; J. Yang; J. Z. Wang, Rating Image Aesthetics Using Deep Learning. IEEE Transactions on Multimedia November 2015, 17(11), 2021-2034.

Non-Patent Literature 3: Grover, Aditya et al., Stochastic Optimization of Sorting Networks via Continuous Relaxations. arXiv preprint arXiv:1903.08850 (2019).

Non-Patent Literature 4: Cuturi, Marco; Olivier Teboul; Jean-Philippe Vert, Differentiable Ranks and Sorting Using Optimal Transport: The Sinkhorn CDF and Quantile Operator. arXiv preprint arXiv:1905.11885 (2019).

Non-Patent Literature 5: Jang, Eric; Shixiang Gu; Ben Poole, Categorical Reparameterization with Gumbel-Softmax. arXiv preprint arXiv:1611.01144 (2016).

SUMMARY

Technical Problem

Known studies use user-defined subjective indices such as the degree by which an item looks delicious or the degree by which an item appears beautiful to quantify personal evaluation and express such evaluation using numbers. For machine learning, true values (true data) for such subjective indices are to be preset for images prepared as training data.

However, people have different tastes and feelings. Defining a true value for each subjective index has been difficult.

Evaluation based on personal subjectivity and experiences or a personal sense of value is difficult to express using numbers. Thus, appropriate subjective indices may be difficult to define. Known approaches have this limitation.

In response to the above issue, one or more aspects of present invention are directed to a technique for predicting a personal operation on multiple objects using machine learning. One aspect of the present invention is directed to a technique for learning, using machine learning, a personal operation dependent on human subjectivity or experiences without presetting definitions and true values for subjective indices.

Solution to Problem

An operation prediction apparatus according to an aspect of the present disclosure includes a dataset obtainer that obtains a dataset including a plurality of objects, an attribute information obtainer that obtains attribute information about a user, and a predictor that predicts an operation to be performed on the dataset by the user based on the dataset and the attribute information using a model trained through machine learning. The model includes a first module that calculates, for each of the plurality of objects in the dataset, an index value corresponding to a combination of the object and the attribute information using a neural network, and a second module that calculates a prediction result of the operation to be performed by the user by performing a predetermined process on a plurality of index values obtained from the first module and corresponding to the respective plurality of objects. The model is trained through machine learning on training data including a sample dataset including a plurality of samples, true data being a result of an operation performed on the sample dataset by an operator, and attribute information about the operator.

The operation prediction apparatus with this structure can predict, in response to a dataset and attribute information, an operation likely to be performed on the dataset by a person corresponding to the attribute information. The operation prediction apparatus may predict operations based on personal evaluation, such as selecting, sorting, and grouping of objects based on hobbies, preferences, or experiences.

For machine learning of such personal operations, known techniques are to preset definitions and true values for subjective indices. In contrast, the operation prediction apparatus with the above structure uses an index value corresponding to the subjective index as an internal parameter of a model and eliminates explicit presetting of definitions or true values for the index value. In other words, during learning, the result of an operation performed by an operator (tester) on a sample dataset (e.g., result of selection, sorting, or grouping) is simply input as true data. This allows automatic generation of the index value correlated with the operation. This allows, through machine learning, prediction of a subjective operation performed by a human without presetting the definitions and true values for the subjective indices.

When a user operation such as selecting, sorting, or grouping objects is performed with the second module, these operations can be simulated using a predetermined process usually as a non-differentiable process. For the second module including a non-differentiable process, during model training, backpropagation cannot be used to propagate an error in the prediction result, which is an output of the second module, to the error in the index value, which is an input into the second module (also the output of the first module). In this case, for example, a dedicated model for estimating the error in the second module may be used to convert the error in the prediction result to the error in the index value.

In response to the above constraints during model training, the predetermined process may be approximated by a process using a differentiable function or by a combination of processes using differentiable functions. Configuring the internal calculations of the second module with a differentiable process allows the error in the prediction result to be propagated back through the second module to the first module. This allows the entire model (more specifically, the first module and the second module together) to be trained through machine learning by backpropagation and allows the model to learn easily.

The neural network may output a probability distribution of the index value in response to an input of at least one object and the attribute information. The first module may sample an index value from the probability distribution output from the neural network and output the sampled index value to the second module. The validity of the prediction result is expected to be improved by such a probability model.

The first module may use a differentiable function to sample the index value from the probability distribution. This allows the first module to be trained through machine learning by backpropagation.

The first module and the neural network may have various structures. For example, the neural network may receive an input of a value obtained with one of the first module or the second module recursively. The first module may output, in response to an input of the plurality of objects, the index value with a condition in which the plurality of objects appear simultaneously or consecutively. At least one object of the plurality of objects may include a plurality of items of information, or the attribute information may include a plurality of items of information. In this case, the first module may include a plurality of submodules corresponding to the respective plurality of items of information, and output, for the at least one object, a plurality of index values obtained with the plurality of submodules.

The predetermined process may include at least one selected from the group consisting of at least one of four arithmetic operations performed on the plurality of index values, sorting of the plurality of objects based on the plurality of index values or values computed from the plurality of index values, a threshold process performed on each of the plurality of index values or a value computed from the index value, selection of at least one object from the plurality of objects based on the plurality of index values or the values computed from the plurality of index values, and grouping of the plurality of objects based on the plurality of index values or the values computed from the plurality of index values.

A model training method according to an aspect of the present disclosure is a method for training a model through machine learning. The model is usable in an operation prediction apparatus. The method includes obtaining a sample dataset including a plurality of samples, obtaining true data being a result of an operation performed on the plurality of samples by an operator, obtaining attribute information about the operator, and training the model through machine learning on the sample dataset including the plurality of samples, the true data, and the attribute information about the operator. In the above method, the training the model through machine learning may include training the first module and the second module by backpropagation based on an error between the true data and an output of the model in response to an input of the plurality of samples and the attribute information about the operator.

An operation prediction method according to an aspect of the present disclosure includes obtaining a dataset including a plurality of objects, obtaining attribute information about a user, and predicting an operation to be performed on the dataset by the user based on the dataset and the attribute information using a model trained through machine learning. The model includes a first module that calculates, for each of the plurality of objects in the dataset, an index value corresponding to a combination of the object and the attribute information using a neural network, and a second module that calculates a prediction result of the operation to be performed by the user by performing a predetermined operation on a plurality of index values obtained from the first module and corresponding to the respective plurality of objects. The model is trained through machine learning on training data including a sample dataset including a plurality of samples, true data being a result of an operation performed on the sample dataset by an operator, and attribute information about the operator.

One or more aspects of the present invention may be directed to an operation prediction apparatus including at least a part of the above elements or structures, or to a system that performs, for example, operations, evaluations, selections of actions, control, simulations, suggestions, recommendations, and searches using the prediction result from the apparatus. One or more aspects of the present invention may also be directed to a model training method and a model training apparatus for a model used in the operation prediction apparatus. One or more aspects of the present invention may also be directed to an operation prediction method or a control method for the operation prediction apparatus including at least a part of the above processes, or to a method for operations, evaluations, selections of actions, control, simulations, suggestions, recommendations, and searches, using the prediction result obtained with the method. One or more aspects of the present invention may also be directed to a program for causing a processor to perform the steps included in the method, or a recording medium recording the program. The above elements and processes may be combined with one another in any manner to form one or more aspects of the present invention.

Advantageous Effects

The technique according to the above aspects of the present invention generates a machine learning model that has learned personal operations dependent on human subjectivity and experiences without presetting definitions and true values for subjective indices, and predicts the personal operations on multiple objects using the model.

DETAILED DESCRIPTION

An operation prediction apparatus, a model training method, and an operation prediction method according to one embodiment of the present invention will now be described with reference to the drawings.

<Prediction Model.

Figure 1:
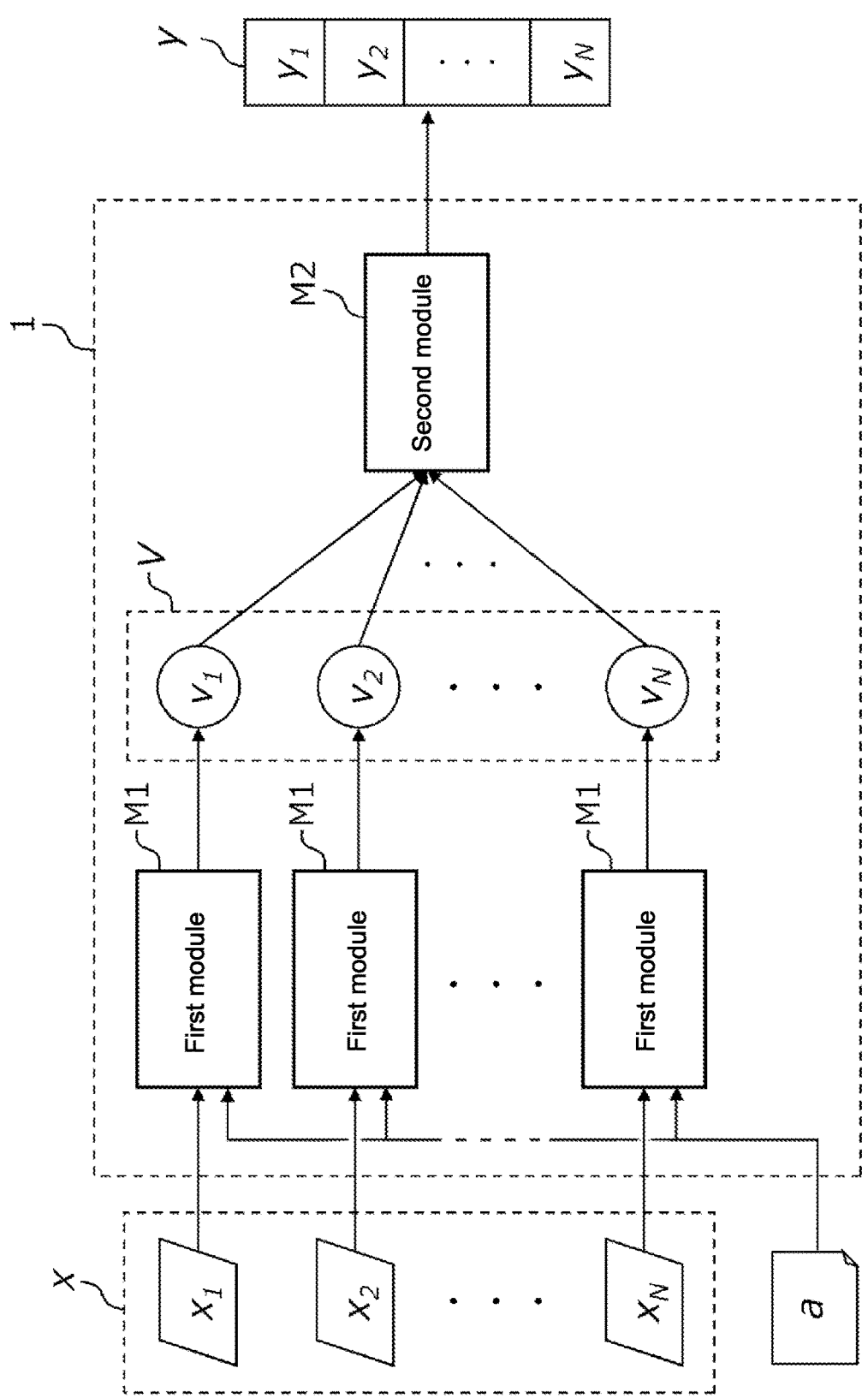
FIG. 1 is a schematic diagram of a prediction model.

A model for predicting personal operations dependent on human subjectivity and experiences (hereafter, a prediction model) will now be described with reference to FIG. 1. FIG. 1 is a schematic diagram of the prediction model.

In response to an input of a dataset $x=\{x_1, \ldots, x_N\}$ of multiple objects and user attribute information a, a prediction model 1 outputs operations likely to be performed by the user on the dataset x as a prediction result $y=\{y_1, \ldots, y_N\}$.

The objects $x_i$ (i=1, ..., N) may be data of any type and designed as appropriate for an application using the prediction model 1. For example, image data (including moving images), text data, and voice data may be used as objects, or a combination of multiple items of data may be used as a single object. Examples of combinations of multiple items of data include a combination of an image and the description of a subject contained in the image (e.g., a cooking recipe and the description of a sightseeing spot) and a combination of an image and geographic information about a location contained in the image (e.g., positional information such as latitude and longitude, the nearest station or airport, and time taken from the nearest station or airport). A combination of items of data may also be a combination of data pieces of the same type, such as a combination of multiple images. The number of objects N may be set as appropriate.

The attribute information a is information for stratifying users. The stratification may be performed differently depending on the application using the prediction model 1. The attribute information may thus be any information. The attribute information may include, for example, age, an age group, sex, blood type, occupation, income, assets, height, weight, health conditions, past illnesses, the place of birth, the place of residence, nationality, family structure, hobbies, and preferences. For an application for outputting personalized results, information for identifying an individual user (the name, personal identification or ID, and social security and tax number) may be used as the attribute information. A single item of information or a combination of multiple items of information (e.g., age and sex) may be input as the attribute information a.

The prediction result y represents the result of an operation performed by the user on the dataset x. Examples of the operation include selection of k objects ($1 \le k < N$), sorting (ranking) and grouping objects, and combinations of these operations. The specific task to be achieved by the operation may be designed as appropriate for an application using the prediction model 1.

The operation performed on the dataset x herein refers to an operation performed on some or all of the objects $x_i$ in the dataset x under the condition reflecting all objects $x_i, \ldots, x_N$ in the dataset x. More specifically, the prediction model

1 does not output an individual prediction result for a single input object but outputs an overall prediction result for a group of N input objects.

As shown schematically in FIG. 1, the prediction model 1 includes a multistage structure including first modules M1 and a second module M2 that are connected together. Each first module M1 in the preceding stage uses a neural network to calculate an index value $v_i$ corresponding to the combination of an input object $x_i$ and the attribute information a. The first module M1 is represented by a probability model $P(v_i|x_i, a)$ for the index value $v_i$ in response to an input of the object $x_i$ and the attribute information a. The first module M1 calculates the index values $v_1, \ldots, v_N$ for the respective objects $x_i, \ldots, x_N$ in the dataset x, and outputs a set of calculated index values $V=\{v_1, \ldots, v_N\}$ to the second module M2. The second module M2 in the following stage calculates the prediction result y by performing a predetermined process on the multiple index values $v_1, \ldots, v_N$ corresponding to the respective multiple objects $x_1, \ldots, x_N$. The second module M2 is represented by a function $y=F(V)$ for outputting the prediction result y from the set of index values $V=\{v_1, \ldots, v_N\}$.

<First Module>

The neural network used in the first module M1 can have any structure and be designed as appropriate for the application using the prediction model 1. For example, a convolutional neural network or an improved version of such a neural network may be used. A neural network to receive a recurrent input of values obtained in either the first module M1 or the second module M2, such as a recursive neural network, may also be used.

FIGS. 2A to 2F and FIGS. 3A and 3B show examples of structural variations of the first module M1.

Figures 2A, 2B, 2C, 2D, 2E, 2F:
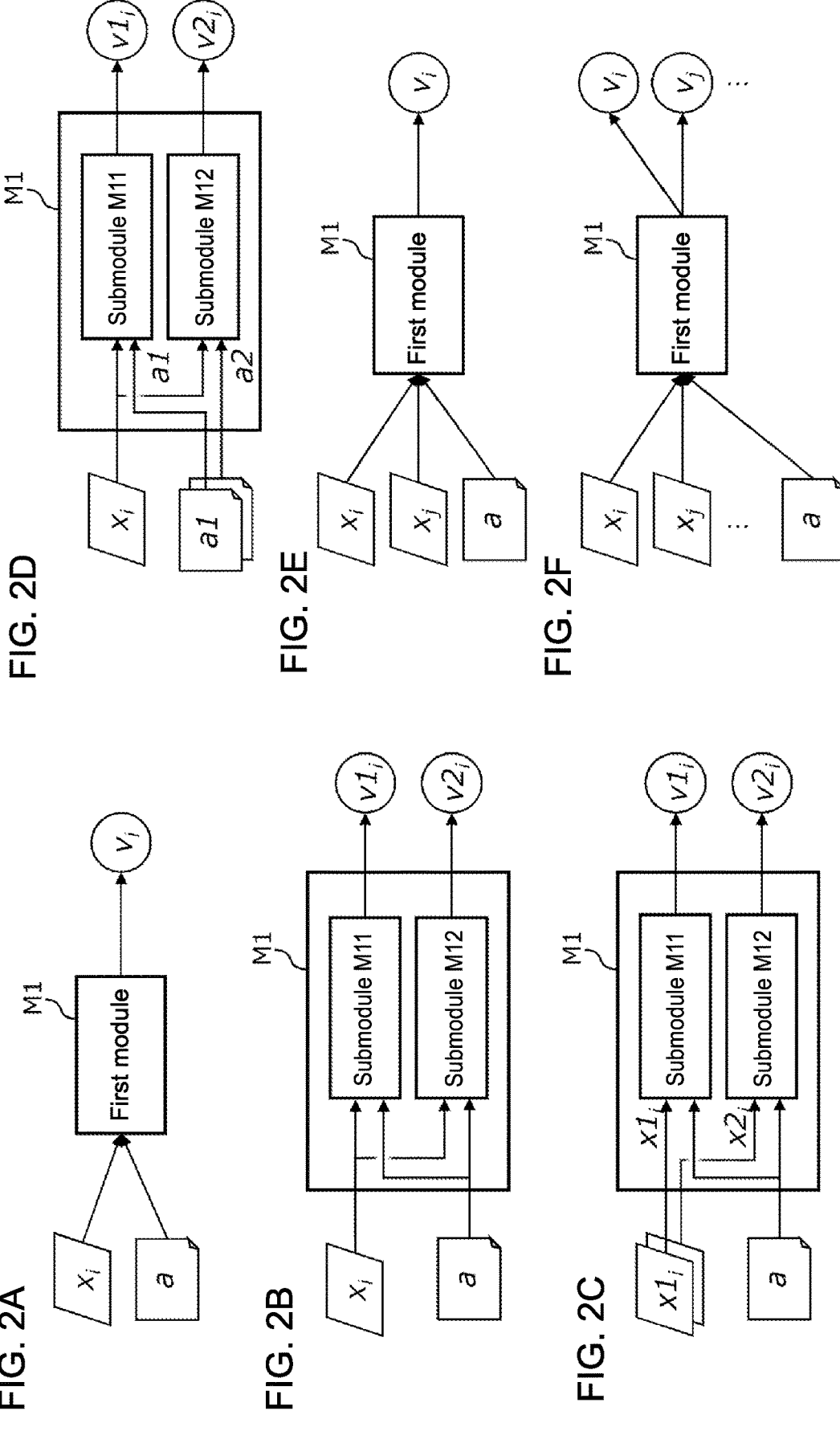
FIGS. 2A to 2F are diagrams showing structural variations of a first module.

FIG. 2A shows the structure that receives an input of one object $x_i$ and the attribute information a and outputs one index value $v_i$.

FIGS. 2B to 2D each show the structure that receives an input of one object $x_i$ and the attribute information a and outputs multiple index values $v1_i$ and $v2_i$. The first module M1 of this type includes a combination of multiple submodules M11, M12, ... designed to output different index values $v1_i, v2_i, \ldots$. FIGS. 2B to 2D each show an example combination of two submodules. A combination of three or more submodules allows an output of three or more index values for a single input object $x_i$.

In the example of FIG. 2B, the same data $(x_i, a)$ is input into each of the submodules M11 and M12. However, the submodules M11 and M12 have different structures, or have the same structure but have different internal parameters obtained through learning, thus possibly outputting different index values $v1_i$ and $v2_i$.

FIG. 2C is an example of one object $x_i$ being data containing multiple information items $x1_i$ and $x2_i$ (e.g., an image $x1_i$ and a text $x2_i$). The sub-module M11 outputs a first index value $v1_i$ based on the information $x1_i$ and the attribute information a. The sub-module M12 outputs a second index value $v2_i$ based on the information $x2_i$ and the attribute information a.

FIG. 2D is an example of the attribute information a being data containing multiple information items a1 and a2 (e.g., age a1 and sex a2). The sub-module M11 outputs a first index value $v1_i$ based on the object $x_i$ and the attribute information a1. The sub-module M12 outputs a second index value $v2_i$ based on the object $x_i$ and the attribute information a2.

FIG. 2E is an example of multiple objects being input into the first module M1. One of the multiple objects is a target object $x_i$ for which the index value $v_i$ is to be calculated, and the remaining objects are reference objects $x_j$. One reference object $x_j$ or multiple reference objects $x_j$ may be used. In this structure, the first module M1 may output a conditional probability with the condition in which the multiple objects $x_i$ and $x_j$ appear simultaneously or consecutively as the index value $v_i$.

FIG. 2F also shows an example of multiple objects being input into the first module M1. This structure differs from the structure shown in FIG. 2E in that the first module M1 outputs the index values $v_i$, $v_j$, . . . corresponding to the respective input objects $x_i$, $x_j$, . . . . In this structure, the index value $v_i$ is the conditional probability of the object $x_i$ with the condition in which the multiple objects $x_i$, $x_j$, . . . appear simultaneously or continuously, and the index value $v_j$ is the conditional probability of the object $x_j$ with the same condition.

Figure 3A:
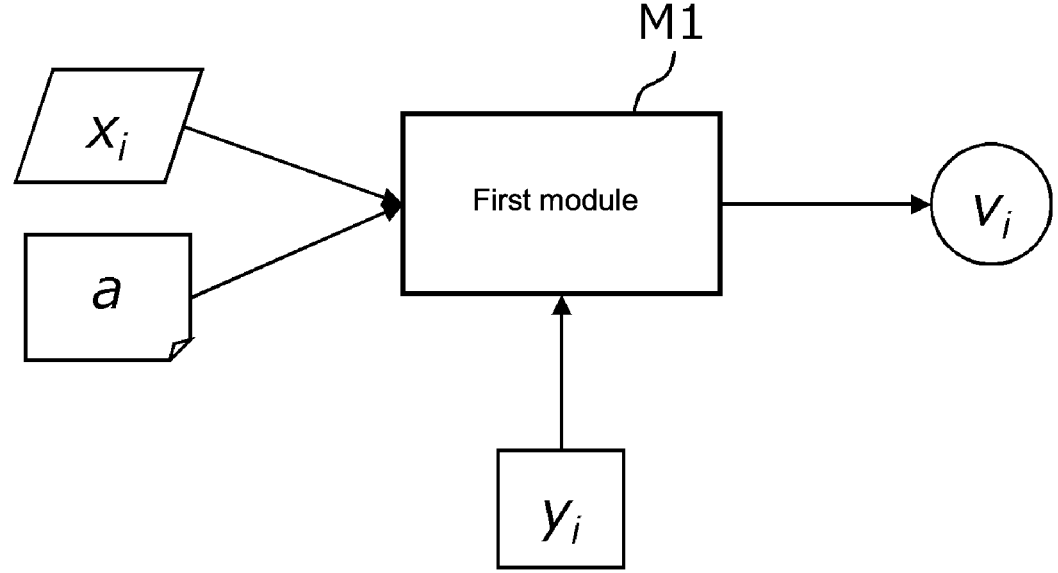
FIGS. 3A and 3B are diagrams showing structural variations of the first module.
Figure 3B:
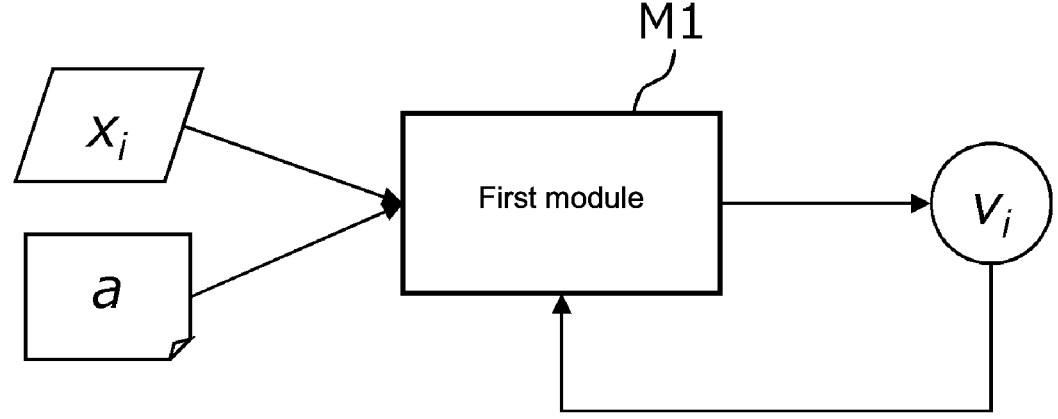

FIG. 3A shows an example structure for recursively inputting the prediction result y output from the second module M2 into the first module M1. FIG. 3B shows an example structure for recursively using the index value $v_i$ output from the first module M1 as an input into the first module M1. The prediction result y and the index value $v_i$ may be input into an intermediate layer of the neural network in the first module M1 or input into the input layer.

The structure of the first module M1 is not limited to the structures shown in FIGS. 2A to 2F and FIGS. 3A and 3B. In the examples shown in FIGS. 2B to 2D, two index values are output. However, the structure is not limited to this example and may be designed to output three or more index values. When both the object $x_i$ and the attribute information a contain multiple items of information, the number of index values corresponding to all combinations of the items may be output. The structures shown in FIGS. 2A to 2F may be combined as appropriate into the first module M1 that receives an input of multiple objects and the attribute information and outputs multiple index values. The specific structure for recursion is not limited to the structures shown in FIGS. 3A and 3B. For example, the intermediate state of the first module M1 (e.g., the value of the intermediate layer of the neural network or the value of the output layer) may be used as an input recursively, or the intermediate state of the second module M2 (e.g., the value during the calculation of the prediction result y) may be used as an input recursively.

Figure 4:
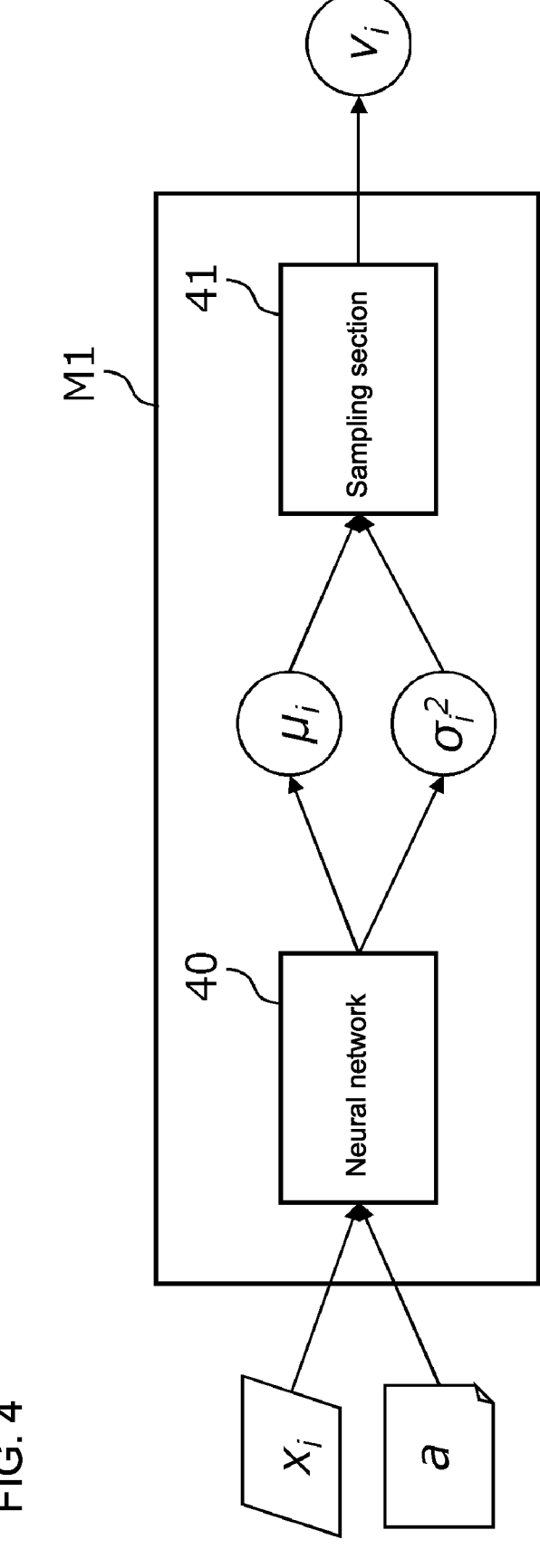
FIG. 4. is a diagram showing a structural variation of the first module.

FIG. 4 shows an example first module M1. The structure shown in FIG. 4 is the structure of the first module M1 including probabilistic encoders used in variational autoresponders. The first module M1 includes a neural network 40 and a sampling section 41. The neural network 40 is designed to receive an input of at least the object $x_i$ and the user attribute information a and output the probability distribution of the index value $v_i$. In this example, a Gaussian distribution is used for the index value $v_i$, and parameters $\mu_i$ and $\sigma_i^2$ are output from the neural network 40 ($\mu_i$ is a mean, and $\sigma_i^2$ is a variance). The sampling section 41 samples the index value $v_i$ from the probability distribution $N(\mu_i, \sigma_i^2)$ output from the neural network 40. The sampling section 41 may use a differentiable function to determine the index value $v_i$ from the probability distribution $N(\mu_i, \sigma_i^2)$. An example function for calculating the index value $v_i$ is written as the formula below.

$$v_i = \mu_i + \sigma_i v^*$$

-continued
$$v^* \sim N(0, 1)$$

This function is designed to output a mean value plus the probabilistic noise $\sigma_i v^*$ as the index value $v_i$.

This structure for sampling using the differentiable function allows an error in the index value $v_i$ to be propagated back through the sampling section 41 to the neural network 40. This allows the first module M1 to be trained through machine learning by backpropagation.

<Second Module>

The second module M2 performs a predetermined process on the set of index values $V=\{v_1, \ldots, v_N\}$ and outputs the prediction result $y=\{y_1, \ldots, y_N\}$. In particular, the second module M2 does not perform the process on a single element (a single index value $v_i$), but on a set of multiple elements (the set V of index values). This allows the second module M2 to perform operations (e.g., sorting, selection, and grouping) reflecting the relationship with other elements. The predetermined process can be designed as appropriate for an application using the prediction model 1. For example, the predetermined process may include a combination of one or more of the following processes 1) to 5).

1) Four arithmetic operations (e.g., addition, subtraction, and inner product) performed on the index values $v_1, \ldots, v_N$ 2) Sorting the multiple objects $x_1, \ldots, x_N$ based on the index values $v_1, \ldots, v_N$ or values $w_1, \ldots, w_N$ computed from the index values $v_1, \ldots, v_N$ 3) A threshold process performed on the index value $v_i$ or a value $w_i$ computed from the index value $v_i$ 4) Selecting some objects from the multiple objects $x_1, \ldots, x_N$ based on the index values $v_1, \ldots, v_N$ or the values $w_1, \ldots, w_N$ computed from the index values $v_1, \ldots, v_N$ 5) Grouping the multiple objects $x_1, \ldots, x_N$ based on the index values $v_1, \ldots, v_N$ or the values $w_1, \ldots, w_N$ computed from the index values $v_1, \ldots, v_N$ In the processes, the value $w_i$ is obtained with the four arithmetic operations performed on the index value $v_i$.

When, for example, the user operation to be predicted by the prediction model 1 is object selection, the process of the second module M2 can be a combination of the processes 1) and 4). When the user operation to be predicted is sorting (ranking) of all objects, the process of the second module M2 can be a combination of processes 1) and 2). When the user operation to be predicted is sorting (ranking) of some objects, the process of the second module M2 can be a combination of processes 1), 2), and 4).

The prediction result y has predicted values $y_1, \ldots, y_N$ as its elements in response to inputs of the respective objects $x_1, \ldots, x_N$. A predicted value $y_i$ can be of any type, such as a binary value (0 or 1), a continuous value, (a parameter representing) a probability distribution, or a vector. The type of the predicted value $y_i$ and the meanings (definitions) of the value can be designed as appropriate for the application using the prediction model 1.

When, for example, the user operation to be predicted is object selection, the predicted value $y_i$ may be represented by the binary value, with the definition of 1 representing being selected and 0 representing being unselected. In this case, the prediction result y is output as a binary vector such as $y=\{0, 0, 1, 0, 1\}$ (this example represents the prediction result showing that the two objects or the third and fifth objects are selected out of five objects). When the user operation to be predicted is sorting (ranking) objects, a sorting matrix may be output as the prediction result y. The sorting matrix is an N×N matrix (N is the number of objects $x_i$), and the element with the value 1 in the N-dimensional vector $y_i$ in the i-th row represents the order (rank) of the objects $x_i$. For example, the sorting matrix y shown below is an example matrix that defines the order (rank) of the five objects $x_1$ to $x_5$ as 4th, 2nd, 5th, 3rd, and 1st. The objects sorted in accordance with this matrix y are in the order of $x_5$, $x_2$, $x_4$, $x_1$, and $x_3$.

$$y = \begin{bmatrix} y_1 \\ y_2 \\ y_3 \\ y_4 \\ y_5 \end{bmatrix} = \begin{bmatrix} 0 & 0 & 0 & 1 & 0 \\ 0 & 1 & 0 & 0 & 0 \\ 0 & 0 & 0 & 0 & 1 \\ 0 & 0 & 1 & 0 & 0 \\ 1 & 0 & 0 & 0 & 0 \end{bmatrix} \qquad \text{[Math. 1]}$$

When the user operation to be predicted is grouping objects, information identifying the cluster to which the object $x_i$ belongs may be output as a predicted value $y_i$. For example, a K-dimensional one-hot vector may be output as the predicted value $y_i$ with the k-th element alone being 1 and the other elements being 0, where K is the number of clusters, and k is the cluster number to which the object $x_i$ belongs (k=1, . . . , K).

The predetermined process performed with the second module M2 may be approximated by a process using a differentiable function or by a combination of processes using differentiable functions. The internal calculations of the second module including a differentiable process allow an error in the prediction result y to be propagated back through the second module M2 to the first module M1.

The four arithmetic operations in the process 1) are clearly differentiable. For the sorting in the process 2), for example, the processes described in Non-Patent Literatures 3 and 4 may be used. For the threshold process in the process 3), for example, a sigmoid function or a hard-sigmoid function can be combined with a straight-through estimator (STE). For a forward pass, the sigmoid function or the hard-sigmoid function can be used to binarize the data. For a backward pass, a gradient can be calculated using pre-stored pre-binarized values. For the selection in the process (4), for example, the Gumbel-softmax (refer to Non-Patent Literature 5) or a softmax-function may be combined with the straight-through estimator.

<Apparatus Configuration>

Figure 5:
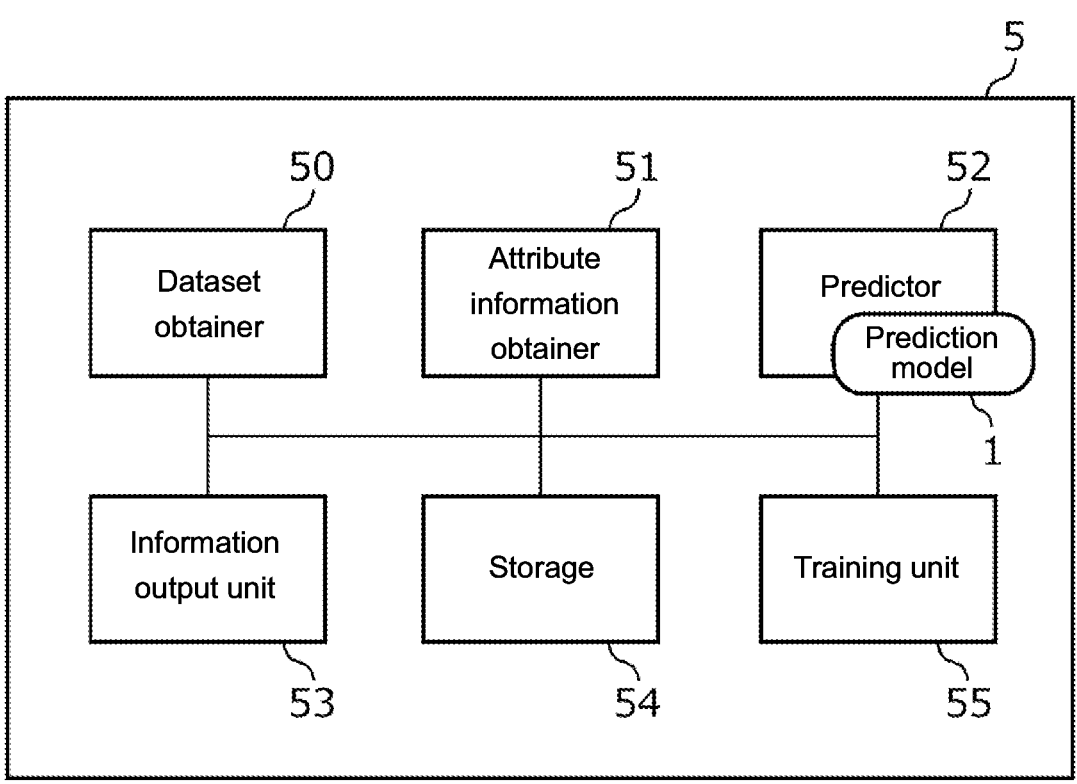
FIG. 5 is a block diagram of an operation prediction apparatus.

FIG. 5 is a block diagram of an operation prediction apparatus 5 using the prediction model 1.

The operation prediction apparatus 5 mainly includes a dataset obtainer 50, an attribute information obtainer 51, a predictor 52, an information output unit 53, a storage 54, and a training unit 55. The dataset obtainer 50 obtains the dataset x. The attribute information obtainer 51 obtains the user attribution information a. The predictor 52 predicts a user operation from the dataset x and the attribute information a using the prediction model 1. The information output unit 53 provides, to the user, various items of information, such as a prediction result and a processing result. The storage 54 is an internal storage for storing various items of data such as the dataset x, the attribute information a, the prediction result, and the processing result. The training unit 55 trains the prediction model 1 through machine learning. The operation prediction apparatus 5 is to include the training unit 55 to train (and to retrain) the prediction model 1. However, the operation prediction apparatus 5 using a trained model generated by another training device may not include the training unit 55.

The operation prediction apparatus 5 may be a general-purpose computer including, for example, a central processing unit (CPU) or a processor, a memory, a storage, a communication device, an input device, and a display device. In this case, the configuration shown in FIG. 5 and the information processing described later are achieved using software by the CPU loading the program stored in the storage into the memory and executing the program. The computer to be used may be in any form such as a personal computer (PC), a smartphone, a tablet, a wearable computer, a game console, and an on-board computer. At least one of the functional components of the operation prediction apparatus 5 may include a field programmable gate-array (FPGA) and an application specific integrated circuit (ASIC), or may be performed by another device such as a cloud server.

<Model Training>

Figure 6:
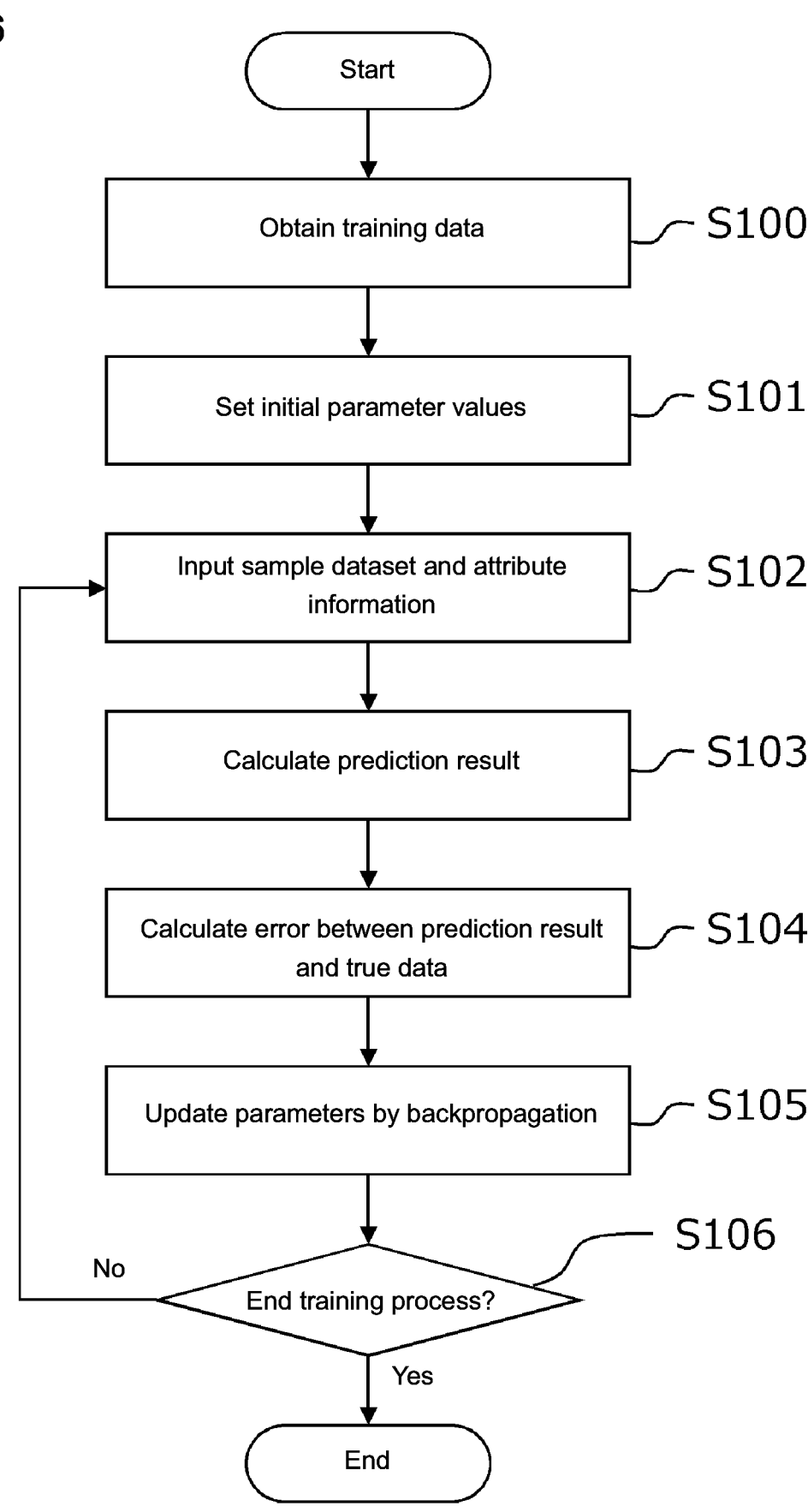
FIG. 6 is a flowchart of an example model training process.

FIG. 6 is a flowchart of an example model training process performed by the operation prediction apparatus 5.

In step S100, the training unit 55 obtains training data. The training data may be obtained from the storage 54, which is an internal storage, or from an external storage. The training data includes a sample dataset $x_s = \{x_{s1}, \ldots, x_{sN}\}$ including N samples, true data $y_t = \{y_{t1}, \ldots, y_{tN}\}$ that results from an operation performed by an operator O on the sample dataset $x_s$, and the attribute information $a_O$ of the operator O. To achieve sufficient prediction accuracy, the learning unit 55 may obtain a large amount of training data, including many sample variations and attribute information variations.

In step S101, the training unit 55 sets initial values for all parameters of the first module M1 (such as the weight of each layer of the neural network), as well as parameter values used for machine learning, such as the learning rate.

In step S102, the training unit 55 inputs the sample dataset $x_s$ and the attribute information $a_O$ included in the training data into the first module M1.

In step S103, a forward pass operation is performed. More specifically, the first module M1 calculates the index value $v_{si}$ from each sample $x_{si}$ and the attribute information $a_O$, and inputs a set of index values $v_s = \{v_{s1}, \ldots, v_{sN}\}$ into the second module M2. The second module M2 then performs a predetermined process on the set $V_s$ of index values and outputs a prediction result $y_s = \{y_{s1}, \ldots, y_{sN}\}$.

In step S104, the training unit 55 calculates an error between the prediction result $y_s$ and the true data $y_t$.

In step S105, the training unit 55 performs a backward pass operation by backpropagation to update the parameters of the first module M1.

In step S106, the training unit 55 performs end determination and ends the training process when a predetermined end condition is satisfied.

The trained prediction model 1 obtained through the above process is stored into the predictor 52 and used for a prediction process described below.

<Prediction Process>

Figure 7:
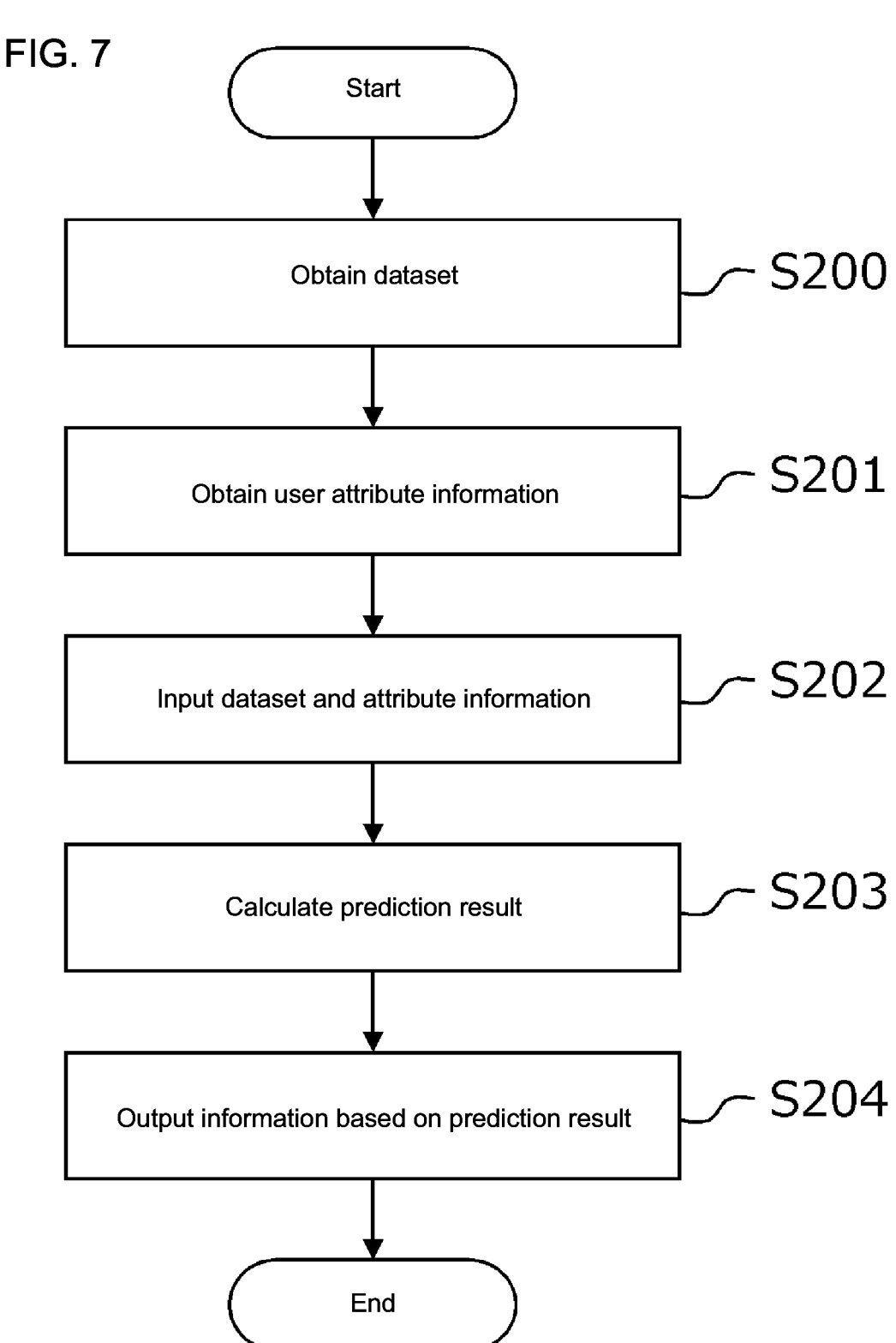
FIG. 7 is a flowchart of an example prediction process.

FIG. 7 is a flowchart of an example prediction process performed by the operation prediction apparatus 5.

In step S200, the dataset obtainer 50 obtains a dataset $x = \{x_1, \ldots, x_N\}$ including N objects. The dataset x may be obtained from the storage 54, which is an internal storage, or from an external storage.

In step S201, the attribute information obtainer 51 obtains the user attribute information a. For example, the attribute information obtainer 51 may display an attribute information input screen as a graphical user interface (GUI) and request the user to input or select the attribute information. The attribute information obtainer 51 may also estimate the user attribute information by analyzing the dataset x, or obtain the user attribute information from another applications or network service (e.g., obtain personal information through ID integration with a social networking service, or SNS, application).

In step S202, the predictor 52 inputs the dataset x and the attribute information a into the first module M1 in the prediction model 1.

In step S203, a forward pass operation is performed. More specifically, the first module M1 calculates the index value $v_i$ from each sample $x_i$ and the attribute information a, and inputs a set of index values $V=\{v_1, \ldots, v_N\}$ into the second module M2. The second module M2 then performs a predetermined process on the set V of index values and calculates the prediction result $y=\{y_1, \ldots, y_N\}$.

In step S204, the information output unit 53 outputs information indicating the prediction result y. Any method for outputting the prediction result y may be used. For example, a list of selected images may appear on the screen, an album may be generated using the selected images, or recommendations may be provided to the user.

First Embodiment

In the embodiment described below, the prediction model 1 is used for a continuous knapsack problem. In the present embodiment, an application is to select a sightseeing spot that can be visited within a predetermined time period from multiple sightseeing spots.

Figure 8:
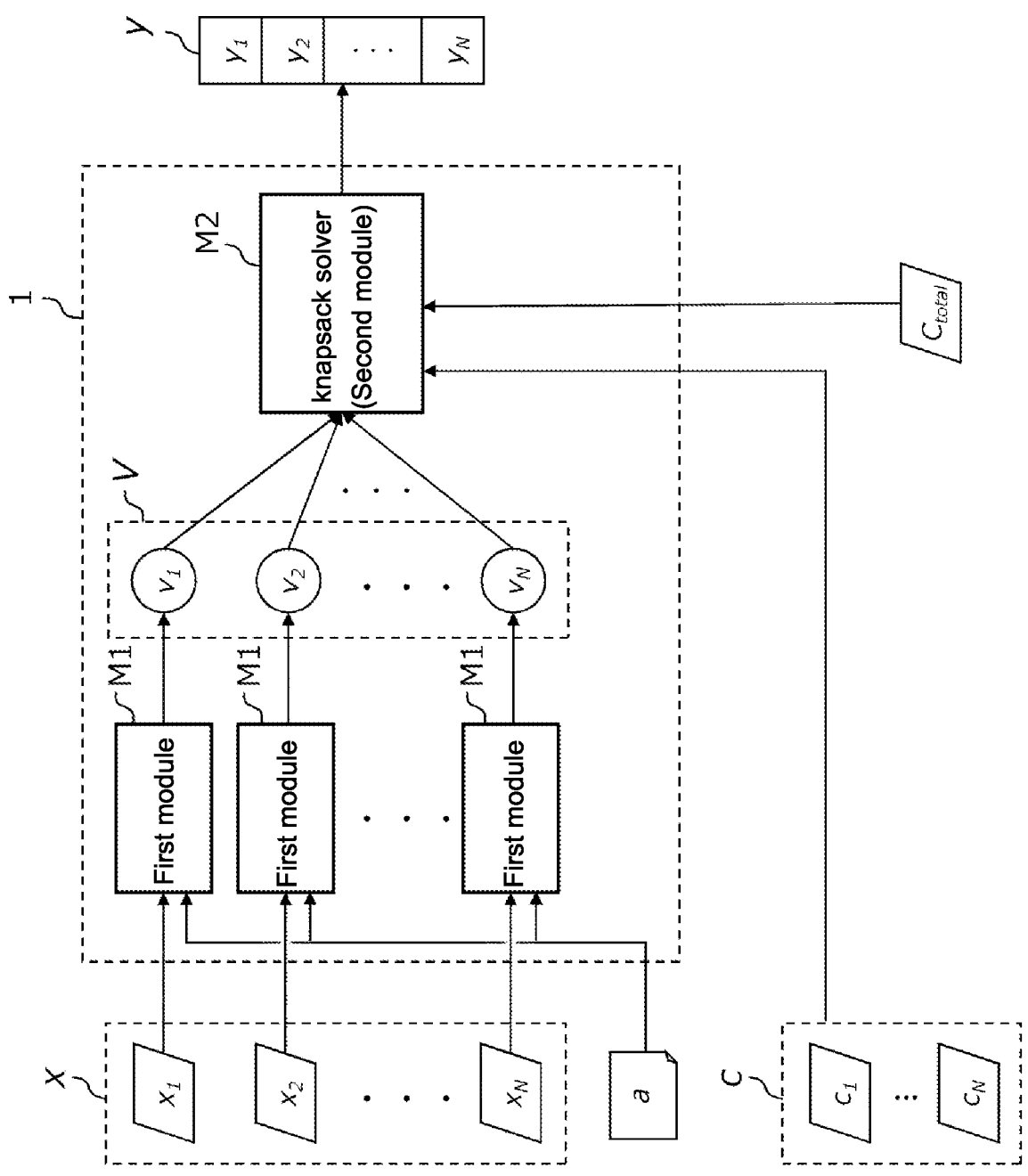
FIG. 8 is a schematic diagram of a prediction model in a first embodiment.

Inputs are a set of images of sightseeing spots $x=\{x_1 \ldots, x_N\}$, the time taken at each sightseeing spot $c=\{c_1, \ldots, c_N\}$, and an age group a as tourist attribute information. A total visit time $C_{total}$ is preset as a constraint condition. An output is an indicator $y_i \in \{0, 1\}$ indicating whether the i-th object $x_i$ has been selected. FIG. 8 is a schematic diagram of a prediction model 1 in the first embodiment. The first module M1 can have the structure (refer to FIG. 2A) for calculating the index value $v_i$ from one object (image $x_i$) and the attribute information (age group a). The second module M2 outputs a solution to the knapsack problem based on the index value V of each sightseeing spot output from the first module M1, the time c taken at each sightseeing spot, and the total visit time $C_{total}$. Although FIG. 8 illustrates the first module M1 with the structure shown in FIG. 2A, the first module M1 with the structure shown in FIGS. 2E and 2F may be used to calculate the index values reflecting combinations of the sightseeing spots that can be visited simultaneously.

Step 1: The first module M1 calculates the index values $v_1, \ldots, v_N$ from the images $x_1, \ldots, x_N$ and the age group a.

Step 2: The second module M2 calculates $w_i=\log(v_i)-\log(c_i)$.

Step 3: The second module M2 sorts the N objects $x_1, \ldots, x_N$ in descending order based on $w_1, \ldots, w_N$, where p(i) is an original index of the i-th object $x_i$ after sorting.

Step 4: The second module M2 calculates a total travel time $C_i$ taken to travel to the i-th sightseeing spot with the following formula.

$$C_i = \sum_{j=1}^{i} c_{p(j)}$$ [Math. 2]

Step 5: The second module M2 calculates sigmoid ($C_i-C_{total}$), sets $y_{p(i)}=1$ for p(i) with the calculated value of 0.5 or greater, and sets the other y elements to 0.

The above processes allow extracting popular sightseeing spots that can be visited within the predetermined time $C_{total}$ for people in the age group a. The prediction result can be used in, for example, applications for arranging and recommending sightseeing courses in accordance with the age of each traveler.

Second Embodiment

In the first embodiment, the prediction model 1 is used for the knapsack problem in which the cost $c_i$ of each object $x_i$ is preset. In the second embodiment, the cost $c_i$ is an unknown parameter and estimated internally by the first module M1.

Figure 9:
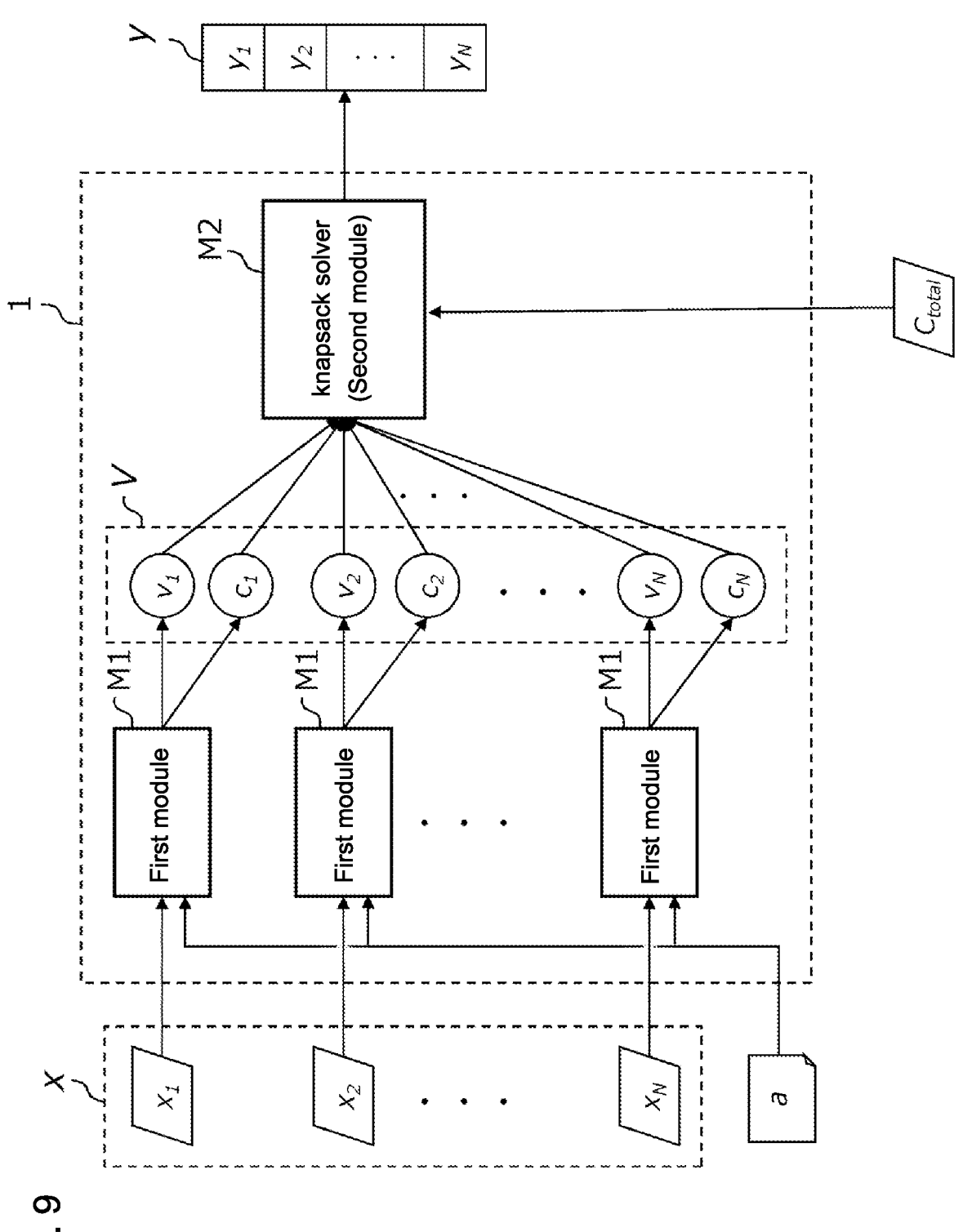
FIG. 9 is a schematic diagram of a prediction model in a second embodiment.

FIG. 9 is a schematic diagram of a prediction model 1 in the second embodiment. Inputs are multiple objects $x=\{x_1, \ldots, x_N\}$ and attribute information a. A total cost $C_{total}$ is preset as a constraint condition. An output is an indicator $y_i \in \{0, 1\}$ indicating whether the i-th object $x_i$ has been selected. The difference from the first embodiment is that the first module M1 calculates a first index value $v_i$ corresponding to the value of the object $x_i$ and a second index value $c_i$ corresponding to its cost from one object $x_i$ and the attribute information a. This is achieved by, for example, using the first module M1 with the structure shown in FIG. 2B. The second module M2 uses a knapsack solver that solves the knapsack problem based on the value $v_i$ and the cost $c_i$ of each object output from the first module M1 and the preset total cost $C_{total}$. The second module M2 may have the same structure as the second module M2 in the first embodiment.

Other Example Uses

The prediction model 1 may be, for example, used in the applications described below.

1. Imitation of Expert Recommendation

From a large number of food images, an expert (e.g., registered dietitian) creates a menu for a week based on the concept such as the Western style or the Japanese style. A prediction model that has learned such creation of a menu provides the menu appearing to be selected by the expert for a new dataset of food images.

2. Recommendation for User

For example, menu images for various users may be used as a sample dataset, and the attributes of each user (e.g., favoring Japanese food) may be estimated from the menu trends and histories. The prediction model generated using the training data can generate a menu preferred by a person with those attributes (e.g., a person who likes Japanese food) in response to an input of a new dataset of the food images and attributes.

3. Automatic Summary Generation

The prediction model 1 described in the first embodiment can be used for automatic generation of content summaries. An example situation of the prediction model 1 includes generating a 60-second promotional video from input video content. The original video content is first split into short clips ranging from a few seconds to a dozen seconds. The video can be split using known methods, such as, by detecting scene transitions or by splitting based on metadata embedded in the video. Each clip is then input into the prediction model 1 as the object $x_i$ and the playback time of each clip as a cost $c_i$. An optimal combination of objects $x_i$ that maximizes the value $v_i$ can be calculated under the constraint of the total cost within 60 seconds. At this time, for example, age groups and interest categories, such as twenties and fashion, may be input as attribute information to create promotional videos that are highly effective in appealing to people in a specific age group and interest categories. In addition to the video contents, the prediction model 1 can be used to generate summaries of any digital content, such as text documents and recorded data.

4. Narrowing Inspection Areas of Device

Figure 10:
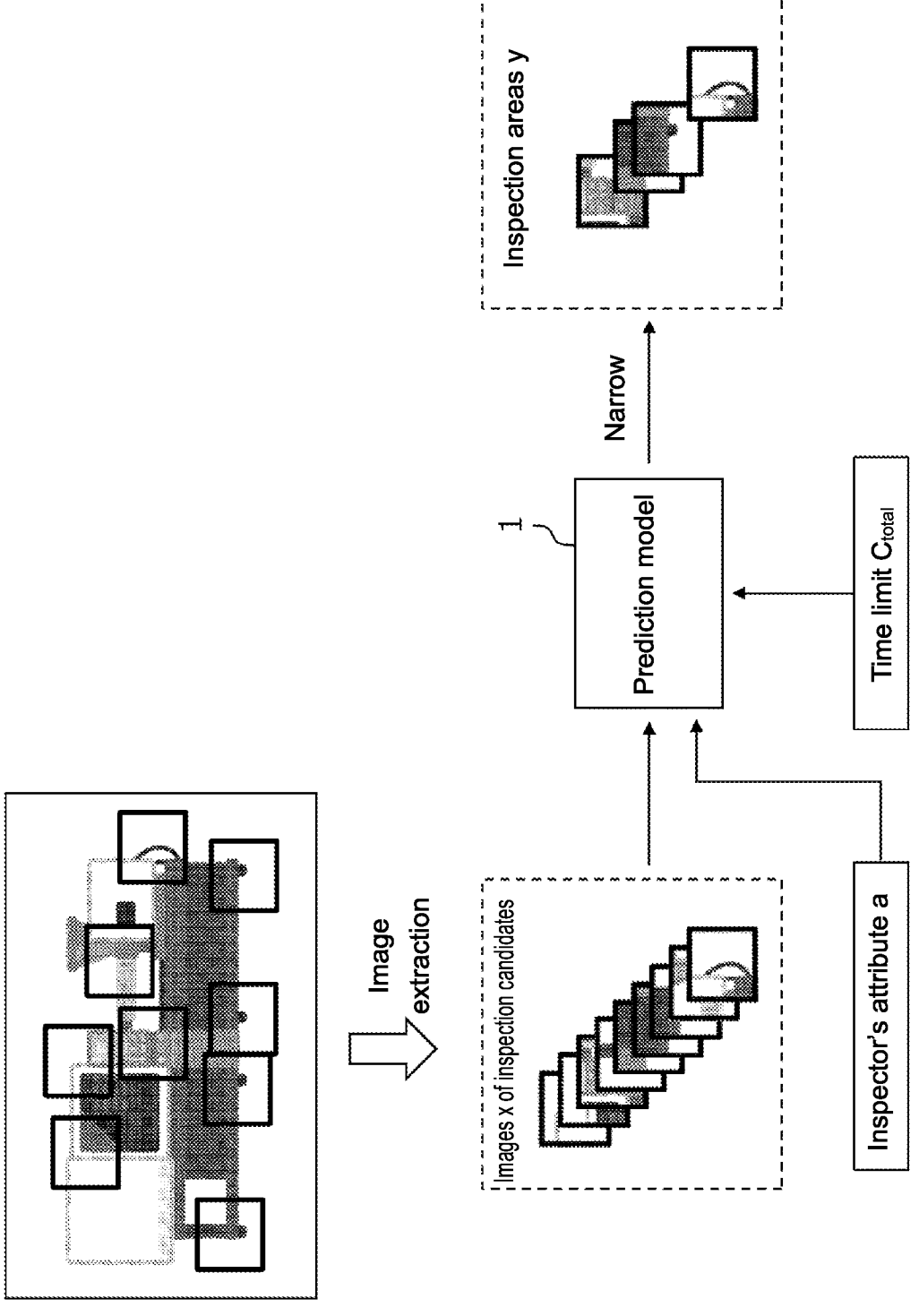
FIG. 10 is a diagram describing example use of a prediction model for assisting in device maintenance.

Example use of the prediction model 1 described in the second embodiment to assist in device maintenance will now be described. For example, a target device may have more than 100 inspection items, and the time taken to inspect all of them thoroughly may be more than one hour. When the device malfunctions during operation and the causes are to be identified within ten minutes, completing more than 100 inspection items in time is impossible. The prediction model 1 may thus be used to narrow the inspection items to the areas to be inspected that are likely to be the causes of the malfunction and can be inspected within the time limit. For example, as shown in FIG. 10, images of candidate areas for the inspection are extracted from the captured image of the device. The image groups x, an inspector's attribute a (e.g., inspection skills), and the time limit $C_{total}$ are input into the prediction model 1 to narrow the areas y to be inspected. Learning the inspection items and the operation time of skilled operators, mid-level operators, and young operators in advance allows the design and recommendation of the inspection procedures in accordance with their respective operation skills, thus allowing efficient inspection. Devices with the same applications and functions typically can have the same areas (specifically, the same inspection items) that are likely to malfunction. Thus, the prediction model 1 can also be used to design efficient inspection procedures for a newly installed device being inspected for the first time.

5. Product Inspection

Example use of the prediction model 1 described in the second embodiment to assist in sampling inspection of products will now be described. When, for example, inspecting all products on a production line is difficult, sampling inspection is performed on a predetermined number of products. At this time, the inspection details and the inspection time vary depending on the conditions of the products. The target objects to be sampled and the time taken for the inspection also vary depending on the skills of each inspector. The prediction model 1 may thus be used to assist in the selection of products to be inspected, thus allowing detecting as many defects as possible within a time limit (e.g., working hours per day).

<Appendix>

1. An operation prediction apparatus (5), comprising:
   a dataset obtainer (50) configured to obtain a dataset including a plurality of objects;
   an attribute information obtainer (51) configured to obtain attribute information about a user; and
   a predictor (52) configured to predict an operation to be performed on the dataset by the user based on the dataset and the attribute information using a model (1) trained through machine learning,
   wherein the model (1) includes
      a first module (M1) configured to calculate, for each of the plurality of objects in the dataset, an index value corresponding to a combination of the object and the attribute information using a neural network, and
      a second module (M2) configured to calculate a prediction result of the operation to be performed by the user by performing a predetermined process on a plurality of index values obtained from the first module (M1) and corresponding to the respective plurality of objects, and
   the model (1) is trained through machine learning on training data including a sample dataset including a plurality of samples, true data being a result of an operation performed on the sample dataset by an operator, and attribute information about the operator.

2. A model training method for training a model (1) through machine learning, the model (1) being usable in an operation prediction apparatus (5), the method comprising:
   (S100) obtaining a sample dataset including a plurality of samples;
   (S100) obtaining true data being a result of an operation performed on the plurality of samples by an operator;
   (S100) obtaining attribute information about the operator; and
   (S102 to S106) training the model through machine learning on the sample dataset including the plurality of samples, the true data, and the attribute information about the operator.

3. An operation prediction method, comprising:
   (S200) obtaining a dataset including a plurality of objects;
   (S201) obtaining attribute information about a user; and
   (S202 and S203) predicting an operation to be performed on the dataset by the user based on the dataset and the attribute information using a model trained through machine learning,
   wherein the model (1) includes
      a first module (M1) configured to calculate, for each of the plurality of objects in the dataset, an index value corresponding to a combination of the object and the attribute information using a neural network, and
      a second module (M2) configured to calculate a prediction result of the operation to be performed by the user by performing a predetermined operation on a plurality of index values obtained from the first module (M1) and corresponding to the respective plurality of objects, and
   the model (1) is trained through machine learning on training data including a sample dataset including a plurality of samples, true data being a result of an operation performed on the sample dataset by an operator, and attribute information (a) about the operator.

REFERENCE SIGNS LIST

1 prediction model
5 operation prediction apparatus

The invention claimed is:
1. An operation prediction apparatus, comprising:
   a dataset obtainer configured to obtain a dataset including a plurality of objects;
   an attribute information obtainer configured to obtain attribute information about a user, wherein the attribute information represents one or more characteristics for stratifying users;
   a predictor configured to predict an operation to be performed on the dataset by the user based on the dataset and the attribute information using a model trained through machine learning; and
   an information output unit configured to output information indicating a prediction result of the model to the user, wherein the model includes a first module configured to calculate as output from the first module, for each of the plurality of objects in the dataset, a probability distribution of an index value using a neural network, wherein the index value represents an implicit subjective evaluation corresponding to a combination of the object and the attribute information, and a second module configured to calculate the prediction result of the operation to be performed by the user by performing a predetermined process on a plurality of index values obtained as input to the second module from the first module and corresponding to the respective plurality of objects, wherein the model is trained through machine learning on training data including a sample dataset including a plurality of samples, true data being a result of an operation performed on the sample dataset by an operator based on a subjective evaluation of the operator, and attribute information about the operator, and wherein the first module samples the plurality of index values from the probability distribution for each index value output from the neural network and outputs the sampled plurality of index values as input to the second module.

2. The operation prediction apparatus according to claim 1, wherein the first module uses a differentiable function to sample the index value from the probability distribution.

3. The operation prediction apparatus according to claim 1, wherein the neural network receives an input of a value obtained with one of the first module or the second module recursively.

4. The operation prediction apparatus according to claim 1, wherein at least one object of the plurality of objects includes a plurality of items of information, or the attribute information includes a plurality of items of information, and the first module includes a plurality of submodules corresponding to the respective plurality of items of information, and outputs, for the at least one object, a plurality of index values obtained with the plurality of submodules.

5. The operation prediction apparatus according to claim 1, wherein the predetermined process includes at least one operation selected from a group including:

(i) at least one of four arithmetic operations performed on the plurality of index values, (ii) sorting of the plurality of objects based on the plurality of index values or values computed from the plurality of index values, (iii) a threshold process performed on each of the plurality of index values or a value computed from the index value, (iv) selection of at least one object from the plurality of objects based on the plurality of index values or the values computed from the plurality of index values, and (v) grouping of the plurality of objects based on the plurality of index values or the values computed from the plurality of index values.

6. The operation prediction apparatus according to claim 1, wherein the predetermined process is approximated by a process using a differentiable function or by a combination of processes using differentiable functions.

7. The operation prediction apparatus according to claim 1, wherein the index value is an internal parameter of the model learned without explicit presetting of definitions or true values for the index value.

8. The operation prediction apparatus according to claim 1, wherein the second module is further configured to calculate the prediction result of the operation to be performed by the user based on a constraint condition that constrains the prediction result.

9. A model training method for training a model through machine learning, the model being usable in an operation prediction apparatus including a dataset obtainer configured to obtain a dataset, an attribute information obtainer configured to obtain attribute information about a user, a predictor configured to predict an operation to be performed on the dataset by the user based on the dataset and the attribute information using a model trained through machine learning, and an information output unit configured to output information indicating a prediction result of the model to the user, the method comprising:

obtaining a sample dataset including a plurality of samples;

obtaining true data being a result of an operation performed on the plurality of samples by an operator based on a subjective evaluation of the operator;

obtaining attribute information about the operator; and training the model through machine learning on the sample dataset including the plurality of samples, the true data, and the attribute information about the operator, wherein the model includes a first module configured to calculate as output from the first module, for each of the plurality of objects in the dataset, a probability distribution of an index value using a neural network, wherein the index value represents an implicit subjective evaluation corresponding to a combination of the object and the attribute information, and a second module configured to calculate the prediction result of the operation to be performed by the user by performing a predetermined process on a plurality of index values obtained as input to the second module from the first module and corresponding to the respective plurality of objects, wherein the model is trained through machine learning on training data including a sample dataset including a plurality of samples, true data being a result of an operation performed on the sample dataset by an operator based on a subjective evaluation of the operator, and attribute information about the operator, and wherein the first module samples the plurality of index values from the probability distribution for each index value output from the neural network and outputs the sampled plurality of index values as input to the second module.

10. The model training method according to claim 9, wherein the training the model through machine learning includes training the first module and the second module by backpropagation based on an error between the true data and an output of the model in response to an input of the plurality of samples and the attribute information about the operator.

11. An operation prediction method, comprising:

obtaining a dataset including a plurality of objects;

obtaining attribute information about a user, wherein the attribute information represents one or more characteristics for stratifying users;

predicting an operation to be performed on the dataset by the user based on the dataset and the attribute information using a model trained through machine learning; and outputting information indicating a prediction result of the model to the user, wherein the model includes a first module configured to calculate as output from the first module, for each of the plurality of objects in the dataset, a probability distribution of an index value using a neural network, wherein the index value represents an implicit subjective evaluation corresponding to a combination of the object and the attribute information, and a second module configured to calculate the prediction result of the operation to be performed by the user by performing a predetermined process on a plurality of index values obtained from the first module and corresponding to the respective plurality of objects, wherein the model is trained through machine learning on training data including a sample dataset including a plurality of samples, true data being a result of an operation performed on the sample dataset by an operator based on a subjective evaluation of the operator, and attribute information about the operator, and wherein the first module samples the plurality of index values from the probability distribution for each index value output from the neural network and outputs the sampled plurality of index values as input to the second module.

\* \* \* \* \*